United States Patent [19]

Okamura

[11] 4,358,071
[45] Nov. 9, 1982

[54] CASSETTE CASE
[75] Inventor: Masatoshi Okamura, Saku, Japan
[73] Assignee: TDK Electronics Co., Ltd., Tokyo, Japan
[21] Appl. No.: 151,678
[22] Filed: May 20, 1980
[30] Foreign Application Priority Data
   May 24, 1979 [JP]  Japan .............................. 54/70150[U]
[51] Int. Cl.³ .......................... G03B 1/04; G11B 15/32
[52] U.S. Cl. ..................................... 242/199; 242/197
[58] Field of Search ............... 242/55, 19 A, 197–200; 360/96, 132; 206/387, 389–393; 220/1 A, 4 B, 4 E; 29/459, 806

[56] References Cited
U.S. PATENT DOCUMENTS

| | | | |
|---|---|---|---|
| 2,034,182 | 3/1936 | Harris | 220/4 B |
| 2,134,997 | 11/1938 | Blandi | 220/4 B |
| 2,973,159 | 2/1961 | Kulka | 242/71.8 |
| 3,099,414 | 7/1963 | Kulka | 242/71.8 |
| 3,495,787 | 2/1970 | Wallace | 242/199 |
| 4,078,657 | 3/1978 | Schurman | 206/387 |
| 4,101,096 | 7/1978 | Oishi et al. | 242/199 |

Primary Examiner—Leonard D. Christian
Attorney, Agent, or Firm—Robert Scobey

[57] ABSTRACT

A tape cassette formed from a cassette body having sections thereof which are adapted to be contacted by a tape and which have a surface roughness within the range of about 3 to 15 microns. In the production of such a cassette, those sections of the case which are adapted to be contacted by the tape are honed to provide a surface roughness within the specified micron range.

2 Claims, 8 Drawing Figures

CASSETTE CASE

BACKGROUND AND BRIEF DESCRIPTION OF THE INVENTION

This invention relates to a cassette case for a magnetic tape, and more particularly to a cassette case in which those sections that contact the magnetic tape are roughened.

It is conventional to produce cassette cases for magnetic tapes by injection molding of plastic material. In the past, it has been believed that if a tape-contact section of a magnetic tape cassette has a rough surface, it might, during feeding of the tape, damage the tape at the base surface thereof, leading to a cutting of the tape or influencing the tape winding torque and phase to deteriorate the recordation or reproduction of sound from the tape. Thus, in the past it has been considered necessary that each such tape-contacting section of a cassette case must be finished to have a very smooth surface (a mirror surface).

Heretofore, in producing a metal mold for cassette cases, those portions of the mold corresponding to the tape-contact sections of the cassette case have been carefully worked to provide such a "mirror surface", and hence are subjected to complicated steps to produce such a surface finish, such as machining, grinding, and the like, which significantly raise production costs. Additionally, metal molds must be handled with sufficient care so that the mold portions just described are not damaged.

Recently, it has become practical to form a main part of a cassette case from a die cast product of a metal material for the purpose of further improving the dimensional accuracy of the cassette case, thereby to improve the feeding of the magnetic tape. In such a case, the inner surfaces of the metal mold for die casting are each worked into a mirror surface having a surface roughness of less than about 0.6 micron, so that the corresponding surfaces of the die cast product are each formed into a mirror surface. The tape-contacting sections of the cassette case thus have mirror-like surfaces, and it has been believed that such surfaces of a cassette case are very effective to reduce frictional engagement with the magnetic tape to permit good tape movement.

Providing a mirror surface has its disadvantages. Specifically, to prevent such surfaces from being roughened during a deburring or surface treating operation after the molding of the case, it is necessary to provide masking on the front face of each cassette case. Such masking requires additional operations, increasing the labor to produce the cassette case and raising production costs.

The present invention proceeds from a new understanding of tape movement in a cassette case, in which it has been found that the mirror surface of the tape-contacting section of the case is not always effective for tape movement. It has been found that such tape-contacting sections should be provided with a predetermined surface roughness to enhance tape movement. Specifically, it has been found that where a thin sheet having an extremely smooth surface, such as a magnetic tape, travels on and along a member that presents a mirror surface, both surfaces closely contact each other, thereby increasing friction between them, causing tape sticking and slipping. In this fashion, such mirror surfaces cause the winding or taking-up torque to be increased to ensure regular and uniform feeding of the tape; otherwise, tape movement will deteriorate, causing such problems as wow and flutter, and poor movement of the tape during its initial start-up movement.

As noted above, the present invention proceeds upon the basis of utilizing tape-contacting surfaces with predetermined roughness, rather than with a mirror surface. It has been found that excellent tape movement characteristics can be achieved by providing a tape-contact section of a cassette case with a surface roughened (by honing or the like), in which the surface roughness is within the range of about 3 to 15 microns, and preferably within the range of about 3 to 10 microns.

Accordingly, it is an object of the present invention to eliminate the necessity of careful finishing of a mold corresponding to the tape-contacting section of a cassette case to provide the same with a mirror surface. It is also an object of the present invention to eliminate the necessity of providing masking during deburring or surface treating ooperations as noted above. It is a further object of the invention to simplify the production of cassette cases.

These objects are achieved by providing a tape-contacting section of a cassette case with a surface roughness within the range of about 3 to 15 microns, and preferably within the range of about 3 to 10 microns.

The invention will be more completely understood by reference to the following detailed description.

DETAILED DESCRIPTION

Figure 1:
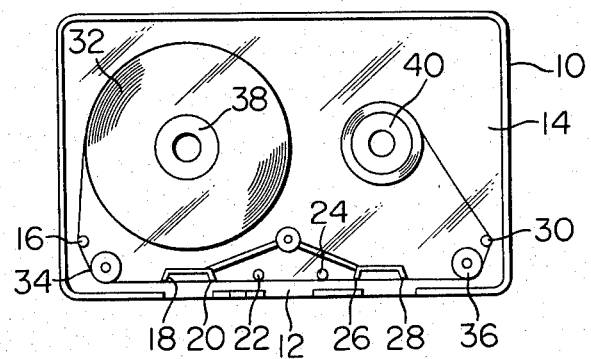
FIG. 1 is a plan view of a cassette case embodying the invention.

FIG. 1 shows the internal construction of a cassette case for a magnetic tape embodying the present invention. A case 10 has a plurality of magnetic tape-contacting sections 16, 18, 20, 22, 24, 26, 28 and 30 formed integrally thereon and extending perpendicularly from the bottom 14 thereof. These tape-contacting sections are disposed in the neighborhood of an internal front surface 12 of the case 10 in a suitably spaced relationship from one another.

Those surfaces of the tape-contacting sections 16–30 which are perpendicular to the bottom 14 are provided with a surface roughness preferably of about 3 to 10 microns.

A pair of guide rollers 34, 36 are rotatably disposed on the case 10 at opposite corners of the front surface thereof. During feeding, a tape 32 is engaged with and guided by the guide rollers 34, 36 as well as the aforementioned tape-contacting sections 16 to 30 of the case 10, and is taken up by and around one of a pair of take-up spools or hubs 38, 40.

The above described tape-contacting sections 16 to 30 of the case 10 are formed integral with the case 10, using a predetermined metal mold. After molding the entire case 10 is ground by liquid honing or the like, using suitable abrasives, so that the tape-contacting sections are provided with a surface roughness of about 3 to 10 microns, as described above.

Functional data of a cassette case having a surface roughness of about 3 to 10 microns in its tape-contacting sections compared with similar data from a conventional cassette case having a mirror finished surface are listed below.

|  | Surface roughness 3 to 10 microns | Mirror Surface |
| --- | --- | --- |
| Wow flutter (WRMS) | 0.04–0.05% | 0.06–0.08% |
| Taking-up torque (MAX.) | 12–15 gcm | 14–17 gcm |
| Phase (10KHz) | within ±60 | within ±75 |

The advantages of surface roughness in terms of enhanced performance are apparent from the above table.

Figure 2:
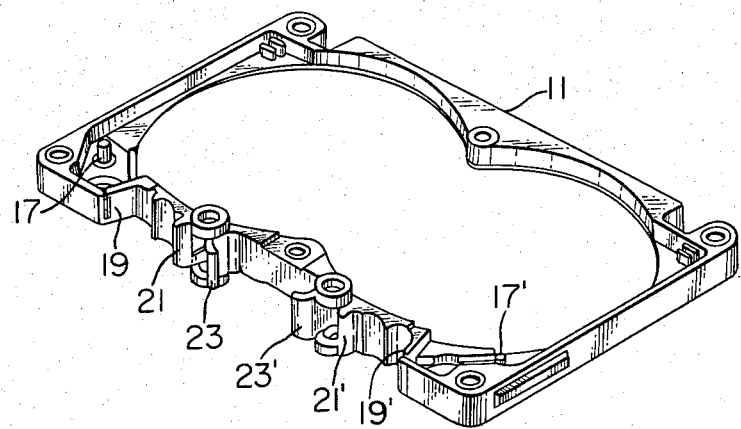
FIG. 2 is a perspective view of a frame part of a cassette case embodying the invention.
Figure 3:
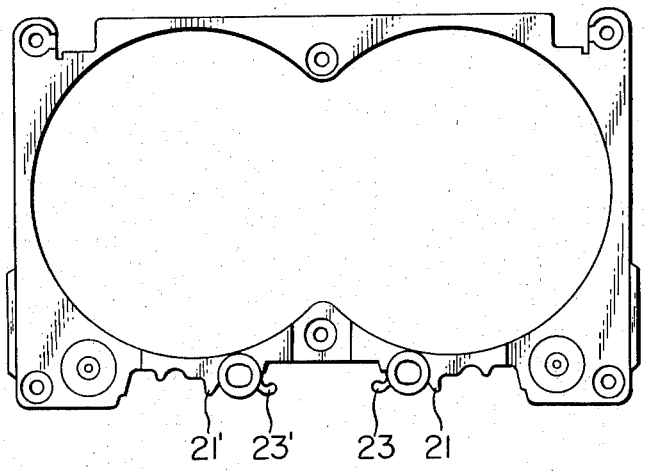
FIG. 3 is a plan view of the frame of FIG. 2.
Figure 5:
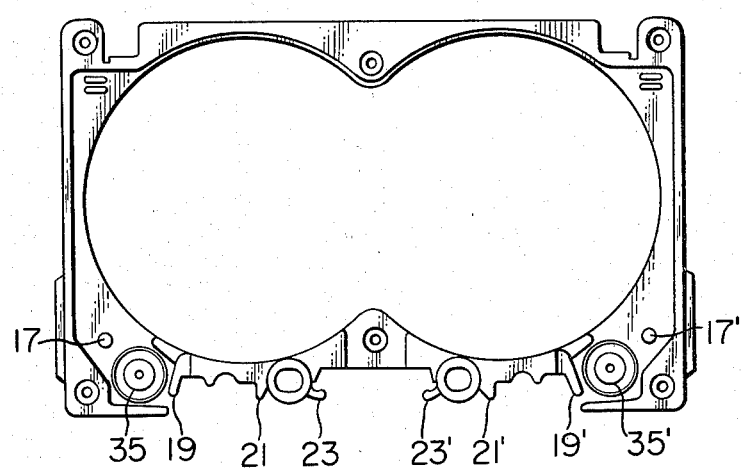
FIGS. 5 and 6 correspond respectively to FIGS. 3 and 4, and are views from the underside of the frame part.

FIG. 2 is a perspective view showing a frame part of a cassette case. FIGS. 3 and 5 are upper and lower views of the frame part. The frame part 11 of the case is cast by die casting. A metal mold for such die casting may preferably have an inner surface with its surface roughness ranging from that of almost a mirror surface up to about 0.6 microns, so that the cast frame part can easily be released from the metal mold.

Subsequently, the frame part released from the metal mold is treated to remove, by press cutting, unnecessary and undesirable portions thereof such as a gate, a runner, a basin, and the like, which were formed thereon during die casting.

The frame part is then put into a vibrating barrel together with grain of abrasives in order to effect barrel polishing to thus remove burrs and the like from the frame part.

The frame part is thereafter honed for anticorrosive treatment, surface treatment, preparatory treatment to plating, and so on. In the present invention, however, the frame part is also treated to provide surface roughness, as described above, i.e., all operations above-named may be completed simultaneously with the surface-roughening treatment required for the tape-contacting sections of the frame part of the cassette case.

As an example, honing is effected at air pressure 4 kg/cm² for a period of one minute, using powder emergy for the grain. Alternatively, iron powder may be used for the grain, and the operation may be effected at air pressure 4 kg/cm²–6 kg/cm² for a period of 0.5–1 minute or so with grain size #60–#1000. These conditions may be changed in accordance with the final surface roughness to be attained.

The frame part just described may be additionally plated to a thickness of about 2 microns.

The frame part thus obtained has a surface roughness of about 5 microns at each of those sections thereof which are adapted to be contacted by a magnetic tape, such as guide poles 17, 17', partition walls 19, 19', projecting walls 21, 21', 23, 23', and the like. The frame part has uniform surface conditions over its whole surface, since it has been honed over its entire surface.

Figure 4:
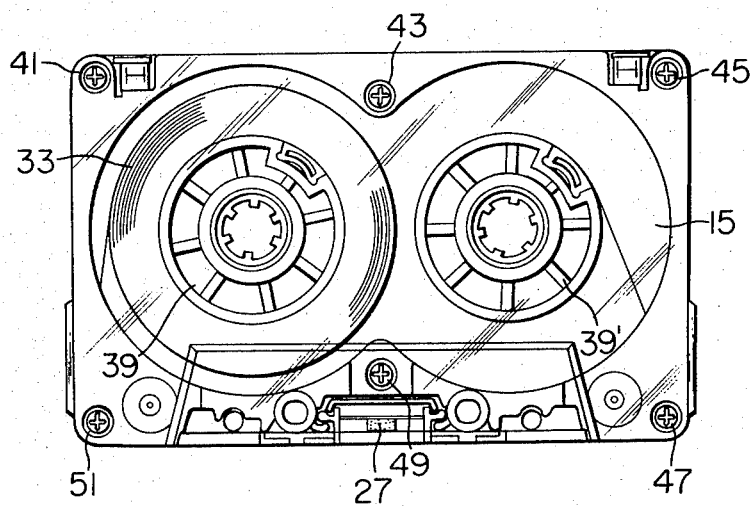
FIG. 4 is a plan view of the frame of FIG. 2, like FIG. 3, including a transparent plastic plate on one side of the frame part.
Figure 6:
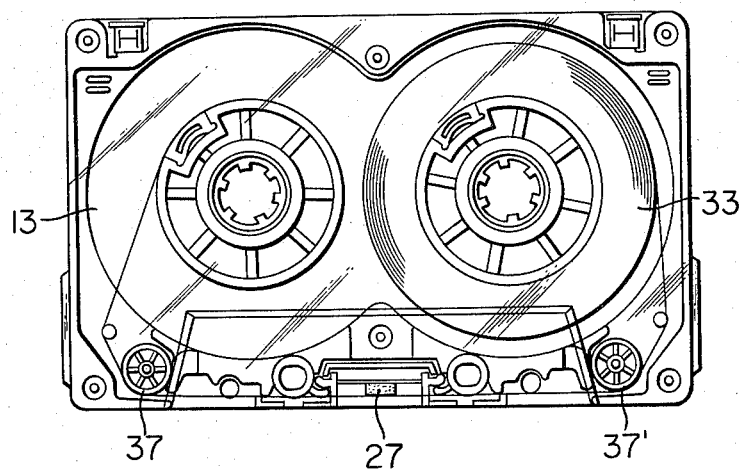

As shown in FIGS. 4 and 6, a transparent plastic plate 15 is provided on one side of this frame part. Guide rollers 37, 37' are received in guide roller receiving sections 35, 35', respectively, and tape hubs 39, 39', a pressure pad 27, and other accessory parts are also received in respective receiving sections of the frame part. Another plastic plate 13 is provided on the other side of the frame part (FIG. 6). Both plastic plates 15, 13 are fixedly fastened to the frame part 11 by means of fastening screws 41, 43, 45, 47, 49 and 51, thus completing a tape cassette. The tape feeding characteristics of a tape cassette thus constituted have been measured, and the measurement data obtained are: wow flutter (WRMS) 0.04%, taking-up torque (MAX.) 12 g cm, and phase (10 KHz) within +60.

Figure 7:
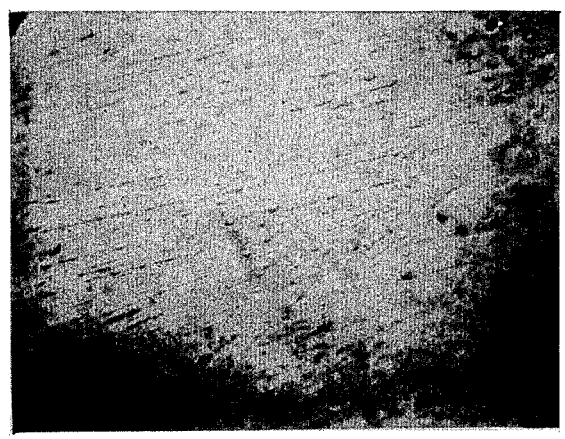
FIG. 7 is a micro photograph showing a surface before honing (mirror surface).

FIG. 7 is a micro photograph of a cassette part showing mirror surface before honing treatment.

Figure 8:
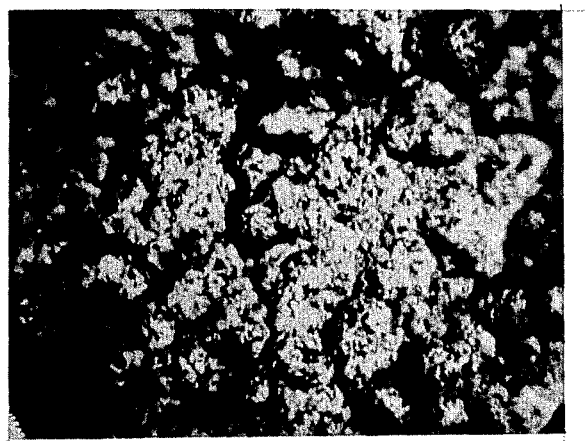
FIG. 8 is a micro photograph showing actual surface in accordance with the invention.

FIG. 8 is a micro photograph of a cassette part showing the surface desired in accordance with the present invention. The part shown is (designate part) of a cassette mechanism. The difference of surface roughness is apparent from the FIG. 7 and FIG. 8.

As is apparent from the foregoing description, according to the present invention, there is no need of mirror finishing the tape-contacting sections of a cassette case, so that production of a metal mold therefor is facilitated and hence production costs can be reduced, and complicated operations such as the aforementioned masking of the surface finishing can be eliminated, simplifying the production processes of cassette cases and improving productivity. Uniform surface finish of cassette cases as in the present invention will also serve to improve their appearance.

In addition, in using a cassette case according to the present invention, there is no fear of a tape being cut by the case and it serves for good recording and reproducing of sound.

It is to be noted that the frame part may be formed as a die cast article of an aluminum alloy; similar results will be obtained with a frame part made of zinc, magnesium, iron, brass, or alloys of such metals.

While the invention has been described in detail in reference to preferred embodiments, it will be understood by those skilled in the art that the present invention is not limited to the specific embodiments shown, and that other changes in form and details may be made without departing from the spirit and scope of the invention. The invention thus should be taken as defined by the following claims.

I claim:

1. In a tape cassette that includes a cassette body having sections thereof which are adapted to be contacted by a tape, the improvement wherein said sections have a surface roughness within the range of about 3 to 15 microns, and wherein said body comprises a metal frame formed by die casting, a first plastic plate provided on one side of said frame, and a second plastic plate on the other side of said frame, said tape contact sections of said body constituting parts of said metal frame.

2. A tape cassette as in claim 1, wherein said surface roughness is within the range of about 3–10 microns.

* * * * *